United States Patent [19]
Ramos

[11] 3,942,736
[45] Mar. 9, 1976

[54] RIBBON DISPENSER

[76] Inventor: Dennis Ramos, 255 Barham St., Santa Rosa, Calif. 95401

[22] Filed: Apr. 18, 1975

[21] Appl. No.: 569,364

[52] U.S. Cl. .............................................. 242/96
[51] Int. Cl.² ...................................... B65H 75/40
[58] Field of Search ............. 242/96, 84.8, 85, 85.1

[56] References Cited
UNITED STATES PATENTS

| | | | |
|---|---|---|---|
| 2,035,379 | 3/1936 | Stewart | 242/84.8 |
| 2,106,053 | 1/1938 | Laingor | 242/84.8 |
| 3,026,052 | 3/1962 | Wade | 242/96 X |

*Primary Examiner*—Edward J. McCarthy
*Attorney, Agent, or Firm*—Jack C. Munro

[57] ABSTRACT

A dispenser for a spool of ribbon wherein the spool is rotatably mounted within an open frame. An adjustment means interconnects between the spool and the frame in order to vary the tension of the dispensing of the ribbon. A handle means is attached to the frame and includes a rotatable member therein through which person's finger may be positioned and the entire device then rotated with respect to the person's finger. A funnel is attached to the forward end of the frame and the ribbon is conducted therethrough and the funnel includes a flat spout through which the ribbon is passed. The flat spout maintains the ribbon in a flat aligned condition with respect to the frame.

9 Claims, 4 Drawing Figures

U.S. Patent   March 9, 1976   3,942,736
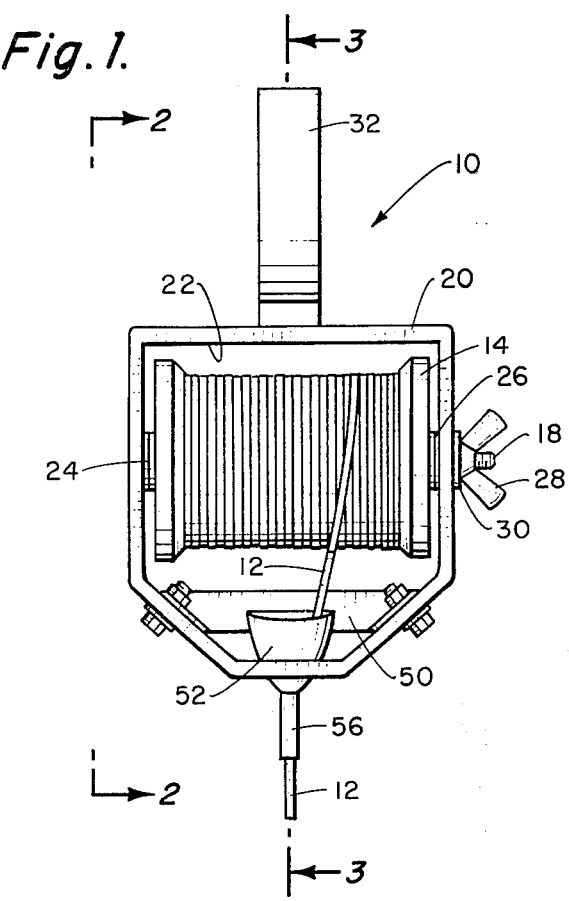
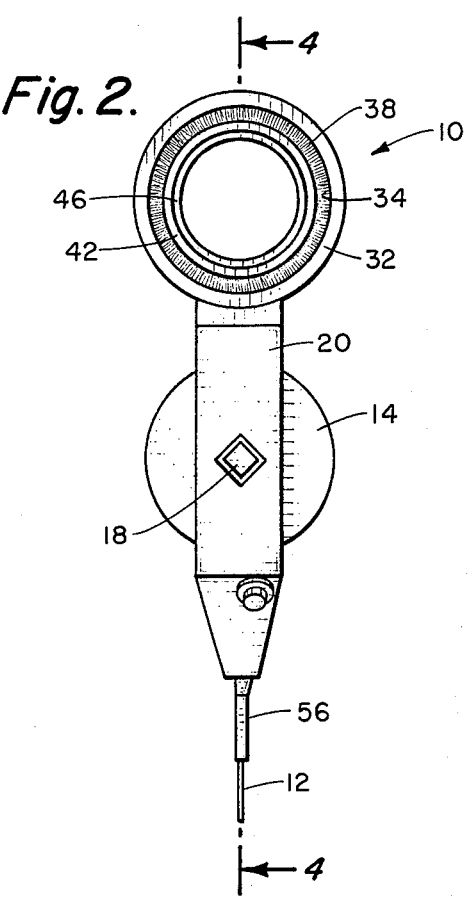
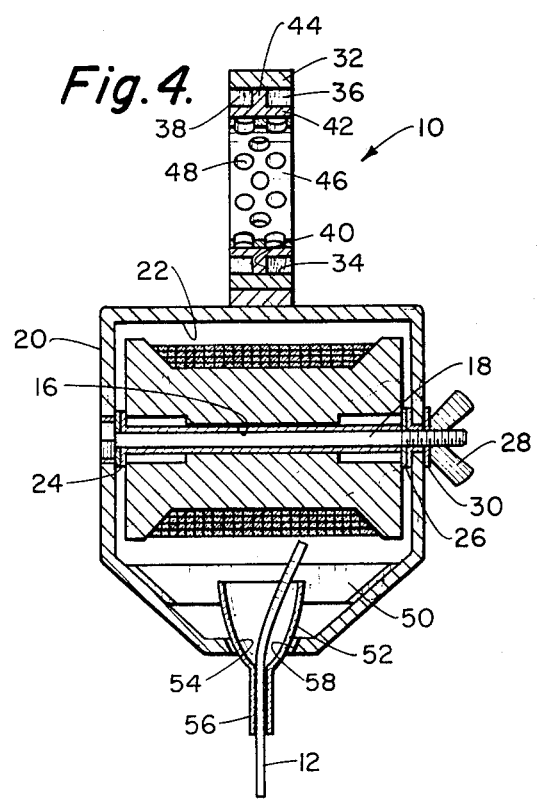
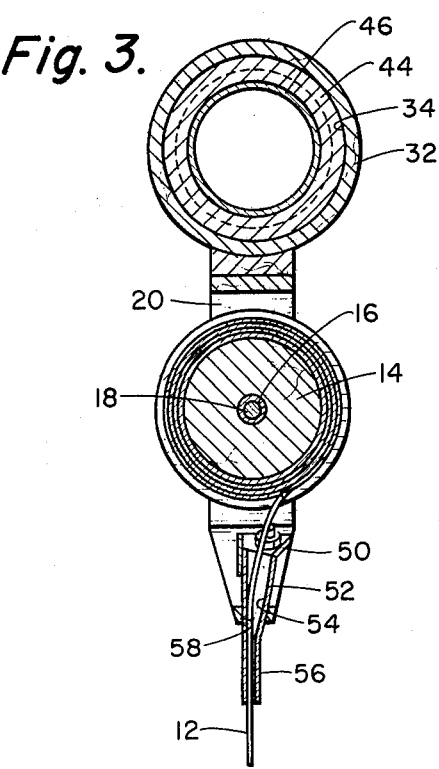

RIBBON DISPENSER

BACKGROUND OF THE INVENTION

The field of this invention relates to dispensers, and more particularly to a dispenser for a ribbon, such as tinsel which is used in the tieing of flies for fishing.

A most common type of fishing relates to the use of a fly rod wherein a fish hook that is dressed to appear like an insect is cast upon the water, caused to remain a few seconds and then removed and then caused to be again cast upon the water. This procedure is continuously repeated in order to make the fly appear like a real insect so as to entice a fish to strike the fly.

The constructing of these flies is quite a tedious, time consuming procedure and also has become an art in itself. Some people spend long hours trying to construct a fly of a particular design which is believed will be readily sought after by fish.

The constructing of these flies with tinsel is usually employed. This tinsel is flat like a ribbon and is usually in the form of some bright color, such as gold. The tinsel may be wound upon a tiny little member of the fly several times and it is desired that this winding be such that the tinsel is not twisted. Also, the winding of it should be done at the same tension so that the tinsel will be tightly wound and will give a smooth appearance upon the fly. Such tinsel is usually supplied on a spool and it is difficult to accomplish these objectives by merely grasping the spool, removing a length of tinsel and winding the tinsel upon the fly.

Previously, there has been no known dispenser for a spool of tinsel to wind such upon a fly to be used in fishing.

SUMMARY OF THE INVENTION

This invention is believed to be summarily described within The Abstract Of The Disclosure and reference is to be had thereto.

The primary objectives of the apparatus of this invention is to design a dispensing apparatus for tinsel which is to be used in the making of flies for fishing, the dispenser facilitating the dispensing of the tinsel at an exact location and to facilitate its winding about the to be constructed fly at the same tension throughout the entire winding procedure. Another objective of this invention is that the tension of the wound tinsel can be readily adjusted and maintained at a selected value.

BRIEF DESCRIPTION OF THE DRAWING

FIG. 1 is a top plan view of the dispenser of this invention;

FIG. 2 is a side view taken along line 2—2 of FIG. 1;

FIG. 3 is a cross-sectional view taken along line 3—3 of FIG. 1; and

FIG. 4 is a cross-sectional view taken along line 4—4 of FIG. 2.

DETAILED DESCRIPTION OF THE SHOWN EMBODIMENT

Referring particularly to the drawing, there is shown the ribbon dispenser 10 of this invention which is adapted to dispense at a constant tension the tinsel or ribbon 12 which is wound on a spool 14. The spool 14 includes a central elongated opening 16 therethrough. A rod assembly 18 extends through the opening 16 and supports the spool 14 so as to permit easy rotation of the spool 14 upon the rod assembly 18. The rod assembly 18 comprises a rod which is conducted through a hollow tube.

Each end of the rod assembly 18 is conducted through appropriate openings formed within a frame 20. An enclosed area 22 is formed within the confines of the frame 20 and it is within this area that the spool 14 is located. One end of the rod assembly 18 is secured to the frame 20 with the other end of the rod assembly 18 being threaded. A first set of washers is located about the rod 18 between the spool 14 and the fixed end of the rod assembly 18. A second set of washers 26 are located about the threaded end of the rod assembly 18 between the spool 14 and the frame 20. Connected to the threaded end of the rod assembly 18 is a wing nut 28. A washer 30 is located between the wing nut 28 and the frame 20.

Attached to one end of the frame 20 is a handle which is composed of a cylindrical shaped member 32. The member 32 includes a central cylindrical shaped opening 34. Attached to the member 32 and located within the confines of the opening 34 are a pair of annular strips of material 36 and 38. The strips of material 36 and 38 are located in a spaced apart manner forming a annular opening 40 therebetween. The material 36 and 38 can comprise any conventional type of material, but the synthetic nylon type of material which is commonly sold under the trade name of Velcro has been found to be preferable. However, it is considered to be within the scope of this invention that any other type of material could be employed.

A cylindrically shaped inner member 42 is positioned within the member 32. Formed about the exterior of the inner member 42 is an annular protuberance 44. The protuberance 44 is located within the annular opening 40. A covering material 46, such as a strip of leather, is attached to the inside of the member 42. The material 46 may include a series of ventilation openings 48, if desired.

Attached to the frame 20 is a brace 50. The brace 50 supports a funnel 52. The funnel 52 includes an enlarged inlet opening 54. The exit opening of the funnel 52 is formed by a flattened spout 56. The spout 56 causes the ribbon 12 to be dispensed in a particular alignment, that is, holds the ribbon in a flat position. The spout 56 and the funnel 52 extend through an opening 58 formed within the frame 20.

The operation of the ribbon dispenser of this invention is as follows: It will be assumed that the spool 14 with the ribbon 12 wound thereon is attached as shown in FIGS. 1 and 2 with the ribbon 12 extending through the enlarged opening 54 of the funnel 52 and through the exit opening provided within the spout 56. A person then grasps the handle 32 and extends his forefinger within the member 42. The ribbon 12 is then tied to the article of manufacture (not shown) at a desired location. The person then proceeds to revolve the entire unit about the article of manufacture thereby winding the ribbon thereon. During the revolving of the dispenser 10, the member 42 remains essentially stationary and the entire remaining part of the dispenser is revolved with respect to the member 42. This revolving is permitted due to the strips 36 and 38 which are the only connection between the member 42 and the handle member 32. The annular protuberance 44 prevents lateral movement of the member 42 with respect to the member 32.

To adjust the tension of the ribbon 12, the person only needs to tighten or loosen the wing nut 28. This tightens or loosens the spool 14 with respect to the frame 20 by exerting a frictional force between the washers assemblies 24 and 26. This adjustment can be accomplished quite precisely and once it is established, the tension of the ribbon will be maintained until the adjustment is changed.

The material of construction of the device of this invention could be made from plastic, wood or any other rigid material.

What is claimed is:

1. A ribbon dispenser comprising:
    a frame within which is supported by supporting means a supply of ribbon, said ribbon being dispensible from said supporting means;
    a dispensing supply funnel attached to said frame, said ribbon conductible through said funnel;
    handle means attached to said frame, said handle means including a member rotatably mounted by a rotation supporting means, whereby a person's finger may be placed upon said member and said frame moved in respect thereto and said frame rotated with said ribbon to be wound about an article of manufacture.

2. The ribbon dispenser as defined in claim 1 wherein:
    said member including a central aperture into which a person's finger is to be located during use.

3. The ribbon dispenser as defined in claim 2 wherein:
    said handle means being cylindrically shaped and said member being similarly cylindrically shaped and mounted within said handle means.

4. The ribbon dispenser as defined in claim 3 wherein:
    said member includes an annular exterior protuberance which is located between annular strips of synthetic material attached to said handle means one on either side of said annular protuberance, whereby, said member is maintained in position within said handle means and normally preventing dislodgement of said member with respect to said handle means.

5. The ribbon dispenser as defined in claim 1 wherein:
    said funnel being connected to a flat spout, whereby said ribbon is conducted through said spout and dispensed in a particular alignment at all times.

6. The ribbon dispenser as defined in claim 5 wherein:
    said member includes a central aperture into which a person's finger is to be located during use;
    said handle means being cylindrically shaped and said member being similarly cylindrically shaped and mounted within said handle means; and
    said member includes an annular exterior protuberance which is located between annular strips of synthetic material attached to said handle means one on either side of said annular protuberance, whereby, said member is maintained in position within said handle means and normally preventing dislodgement of said member with respect to said handle means.

7. The ribbon dispenser as defined in claim 1 wherein:
    said supporting means comprises a spool, said spool supported upon a rod which is connected to said frame, adjustment means attached to said frame to control the tension of said ribbon as it is dispensed by varying the frictional binding of said spool to said frame.

8. The ribbon dispenser as defined in claim 7 wherein:
    said member includes a central aperture into which a person's finger is to be located during use;
    said handle means being cylindrically shaped and said member being similarly cylindrically shaped and mounted within said handle means; and
    said member includes an annular exterior protuberance which is located between annular strips of synthetic material attached to said handle means one on either side of said annular protuberance, whereby, said member is maintained in position within said handle means and normally preventing dislodgement of said member with respect to said handle means.

9. The ribbon dispenser as defined in claim 7 wherein:
    said funnel being connected to a flat spout, whereby said ribbon is conducted through said spout and dispensed in a particular alignment at all times.

* * * * *